US00RE50518E

(19) United States
(12) Reissued Patent
Lee et al.

(10) Patent Number: US RE50,518 E
(45) Date of Reissued Patent: Aug. 5, 2025

(54) METHOD AND DEVICE FOR CONTROLLING MEMORY

(71) Applicants: Samsung Electronics Co., Ltd., Suwon-si (KR); Seoul National University R&DB Foundation, Seoul (KR)

(72) Inventors: Sangheon Lee, Hwaseong-si (KR); Dongwoo Lee, Seoul (KR); Kiyoung Choi, Seoul (KR); Soojung Ryu, Hwaseong-si (KR)

(73) Assignees: SAMSUNG ELECTRONICS CO., LTD., Suwon-si (KR); SEOUL NATIONAL UNIVERSITY R&DB FOUNDATION, Seoul (KR)

(21) Appl. No.: 17/529,490

(22) Filed: Nov. 18, 2021

Related U.S. Patent Documents

Reissue of:
(64) Patent No.: 10,482,033
Issued: Nov. 19, 2019
Appl. No.: 15/467,104
Filed: Mar. 23, 2017

U.S. Applications:
(60) Provisional application No. 62/312,670, filed on Mar. 24, 2016.

(30) Foreign Application Priority Data

Aug. 25, 2016 (KR) ..... 10-2016-0108378

(51) Int. Cl.
*G06F 12/126* (2016.01)
*G06F 12/0895* (2016.01)

(52) U.S. Cl.
CPC ..... *G06F 12/126* (2013.01); *G06F 12/0895* (2013.01)

(58) Field of Classification Search
CPC ..... G06F 12/126; G06F 12/0895; G06F 12/0831; G06F 12/123; G06F 12/0866
See application file for complete search history.

(56) References Cited

U.S. PATENT DOCUMENTS 6,490,657 B1 * 12/2002 Masubuchi ..... G06F 11/2041 711/135
6,499,085 B2 12/2002 Bogin et al.
(Continued)

FOREIGN PATENT DOCUMENTS

JP 2015-210552 11/2015
KR 10-0346817 7/2002
(Continued)

OTHER PUBLICATIONS

Keramidas et al., "Cache Replacement Based on Re-use-Distance Prediction", IEEE, 2007, pp. 245-250.
(Continued)

*Primary Examiner* — Woo H Choi
(74) *Attorney, Agent, or Firm* — MORGAN, LEWIS & BOCKIUS LLP

(57) ABSTRACT

A memory controller includes a dirty group detector configured to, in response to receiving a request for writing data to a memory, modify addresses of a cache group related to a physical address of the memory, increase counters corresponding to the modified addresses of the cache group, and detect whether the cache group is in a dirty state based on the counters; and a dirty list manager configured to manage the cache group in the dirty state and a dirty list including dirty bits according to a result of the detecting; wherein the dirty bits indicate whether a cache set included in the cache group is in the dirty state.

17 Claims, 8 Drawing Sheets

(56) References Cited

U.S. PATENT DOCUMENTS

| | | | | |
|---|---|---|---|---|
| 6,757,784 | B2 | 6/2004 | Lu et al. | |
| 7,171,520 | B2 | 1/2007 | Jung et al. | |
| 7,707,391 | B2 | 4/2010 | Musoll et al. | |
| 8,407,421 | B2 * | 3/2013 | Steely, Jr. | G06F 12/12 711/119 |
| 8,543,766 | B2 * | 9/2013 | Grayson | G06F 12/0804 711/135 |
| 8,935,446 | B1 * | 1/2015 | Shilane | G06F 12/0871 710/62 |
| 8,949,541 | B2 * | 2/2015 | Glasco | G06F 12/0804 711/122 |
| 10,482,033 | B2 | 11/2019 | Lee et al. | |
| 2004/0230737 | A1 * | 11/2004 | Burton | G06F 12/0871 711/3 |
| 2007/0050548 | A1 * | 3/2007 | Bali | G06F 12/0804 711/118 |
| 2011/0055479 | A1 | 3/2011 | West et al. | |
| 2013/0138892 | A1 | 5/2013 | Loh et al. | |
| 2015/0019823 | A1 * | 1/2015 | Wang | G06F 12/0891 711/136 |
| 2016/0246724 | A1 * | 8/2016 | Boehm | G06F 12/0804 |
| 2017/0277636 | A1 | 9/2017 | Lee et al. | |

FOREIGN PATENT DOCUMENTS

| | | |
|---|---|---|
| KR | 10-2004-0057129 | 7/2004 |
| KR | 10-0591218 | 6/2006 |

OTHER PUBLICATIONS

Petoumenos et al., "Instruction-based Reuse-Distance Prediction for Effective Cache Management", IEEE, 2009, pp. 49-58.

Lee et al., "Eager Writeback—a Technique for Improving Bandwidth Utilization", IEEE, 2000, pp. 11-21.

Notice of Allowance issued in corresponding KR Patent Application No. 10-2016-0108378 on Jan. 8, 2025.

Hsien-Hsin S. Lee, Gary S. Tyson and Matthew K. Farrend; Eager Writeback—a Technique for Improving Bandwidth Utilization; Jun. 8, 2002; IEEE.*

Pavlos Petoumenos, Georgios Keramidas and Stefanos Kaxiras; Instruction-based reuse-distance prediction for effective cache management; Oct. 16, 2009; IEEE.*

Pavlos Petoumenos, Georgios Keramidas and Stefanos Kaxiras; Cache Replacement Based on Reuse-Distance Prediction; Aug. 19, 2008;IEEE.*

Loh et al., "Efficiently Enabling Conventional Block Sizes for Very Large Die-stacked DRAM Caches", MICRO 11, Dec. 3-7, 2011.

Lee et al., "Dirty-Block Tracking in a Direct-Mapped DRAM Cache with Self-Balancing Dispatch", ACM Transactions, 2010, pp. 39:1-39:21.

Sim et al., "A Mostly-Clean DRAM Cache for Effective Hit Speculation and Self-Balancing Dispatch", pp. 1-11.

Qureshi et al., "Fundamental Latency Trade-offs in Architecting DRAM Caches".

* cited by examiner

METHOD AND DEVICE FOR CONTROLLING MEMORY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of under 35 USC 119(e) of U.S. Provisional Application No. 62/312,670 filed on Mar. 24, 2016, and the benefit under 35 USC 119(a) of Korean Patent Application No. 10-2016-0108378 filed on Aug. 25, 2016, in the Korean Intellectual Property Office, the entire disclosures of which are incorporated herein by reference for all purposes.

BACKGROUND

1. Field

This application relates to methods and devices for controlling a memory.

2. Description of Related Art

A through-silicon via (TSV) technique has been developed in which a fine hole is bored in a vertically stacked semiconductor chip to connect a silicon upper chip to a silicon lower chip. For example, a 3D (three-dimensional) laminated memory using the TSV technique may be a high bandwidth memory (HBM), a hybrid memory cube (HBC), or a wide input/output (I/O) memory. The 3D laminated memory may provide a wide bandwidth by being integrated into a package with a processor. An internal memory providing a wide bandwidth in a package may be used as a cache of an external memory outside the package due to a relatively small storage space.

However, a lot of unnecessary requests may be transmitted to the internal and external memories of the package when data is written in or read from the memories. Furthermore, the internal and external memories of the package need to be efficiently utilized because bandwidths of the internal and external memories may be different from each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a memory controller includes a dirty group detector configured to, in response to receiving a request for writing data to a memory, modify addresses of a cache group related to a physical address of the memory, increase counters corresponding to the modified addresses of the cache group, and detect whether the cache group is in a dirty state based on the counters; and a dirty list manager configured to manage the cache group in the dirty state and a dirty list including dirty bits according to a result of the detecting; wherein the dirty bits indicate whether a cache set included in the cache group is in the dirty state.

The dirty group detector may be further configured to modify the addresses of the cache group using a plurality of hash functions, and detect that the cache group is in the dirty state in response to all of the counters corresponding to the modified addresses of the cache group being equal to or greater than a threshold.

The dirty group detector may be further configured to reduce the counters by half in response to the result of the detecting being that the cache group is in the dirty state.

Each of the cache sets may include a single tag area and a single data area.

The dirty list manager may be further configured to, in response to receiving the request for writing data to the memory, determine whether the cache group is in the dirty state by determining whether addresses of the cache group are included in the dirty list.

The dirty list manager may be further configured to, in response to the addresses of the cache group not being included in the dirty list, delete an address of another cache group in the dirty list and manage the dirty list.

The dirty list manager may be further configured to, in response to a cache set in the dirty state being included in the deleted cache group, output an address of the cache set in the dirty state included in the deleted cache group.

In another general aspect, a computing device includes a core; a cache configured to store partial information in a memory in a cache set including a single tag area and a single data area; and a memory controller configured to, in response to receiving a request for the memory from the core, track whether the cache is in a dirty state, predict whether the cache is hit, and transmit the request to the memory or the cache based on a result of the tracking or a result of the predicting.

The memory controller may include a tracker configured to, in response to receiving a request for the memory from the core, modify addresses of a cache group related to a physical address of the memory, increase counters corresponding to the modified addresses of the cache group, detect whether the cache group is in a dirty state based on the counters, and track a dirty state of the cache by managing a dirty list including the cache group in the dirty state and dirty bits according to a result of the detecting; a predictor configured to predict whether the cache is hit; and a memory interface configured to transmit the request to the memory or the cache based on the result of the tracking or the result of the predicting; wherein the dirty bits indicate whether the cache set in the cache group is in the dirty state.

The tracker may be further configured to, in response to receiving a request for the memory, determine whether the cache group is in the dirty state by determining whether addresses of the cache group are included in the dirty list; and the memory interface may be further configured to, in response to the request being a request for reading first data in the memory, the tracker determining that the cache group is in a clean state, and the predictor predicting that a cache in the cache group is a cache hit, transmit a request for reading data to the memory or the cache based on a utilization rate of a bandwidth of the memory or the cache.

The memory interface may be further configured to, in response to the request being a request for reading first data in the memory, the tracker determining that the cache group is in a clean state, and the predictor predicting that a cache in the cache group is a cache miss, transmit the first data to the cache after transmitting the request for reading data to the memory.

The memory controller may be further configured to, in response to the request being a request for writing second data in the memory, transmit the second data to the cache in response to the tracker determining that the cache group is in the dirty state, and transmit the second data to the cache and the memory in response to the tracker determining that the cache group is in a clean state.

The memory may be located outside the package; and the predictor may be a instruction-based predictor.

In another general aspect, a method of controlling a memory includes in response to receiving a request for a memory, modifying addresses of a cache group related to a physical address of the memory, increasing counters corresponding to the modified addresses of the cache group, and detecting whether the cache group is in a dirty state based on the counters; and managing the cache group in the dirty state and a dirty list including dirty bits according to a result of the detecting; wherein the dirty bits indicate whether a cache set in the cache group is in the dirty state.

The detecting may include modifying the addresses of the cache group using a plurality of hash function; and detecting that the cache group is in the dirty state in response to all of the counters corresponding to the modified addresses of the cache group being equal to or greater than a threshold.

The method may further include reducing the counters by half in response to detecting that the cache group is in the dirty state.

Each of the cache sets may further include a single tag area and a single data area.

The method may further including determining whether the cache group is in the dirty state by determining whether addresses of the cache group are included in the dirty list in response to receiving a request for writing data to the memory.

The method may further include deleting an address of another cache group included in the dirty list in response to the addresses of the cache group not being included in the dirty list.

The method may further include outputting an address of a cache set in the dirty state included in the deleted cache group in response to the cache set in the dirty state being included in the deleted cache group.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

General and widely used terms have been employed herein, in consideration of functions provided in the examples, and may vary according to an intention of one of ordinary skill in the art, a precedent, or emergence of new technologies. Additionally, in some cases, specific terms may be arbitrarily selected, in which case, the specific terms will be define in the description of the examples. Accordingly, the terms used herein are to be interpreted as having a meaning that is consistent with their meaning in the context of the relevant art, and are not be interpreted in an idealized or overly formal sense unless expressly so defined herein.

Throughout the specification, when a unit is referred to as being "connected" to another element, it may be "directly connected" to the other element or "electrically connected" to the other element in a state in which intervening elements are present. In addition, when a unit is referred to as "comprising" another element, this does not exclude the other element, but may further include the other element unless specifically stated otherwise. In addition, terms such " . . . unit" and " . . . module" refer to elements that perform at least one function or operation, and are implemented in hardware.

The terms "comprise" and "include" are not to be construed as necessarily including various elements or operations described in the specification, and but are to be construed to mean that some of the elements or the operations may not be included, or additional elements or operations may be included.

Figure 1:
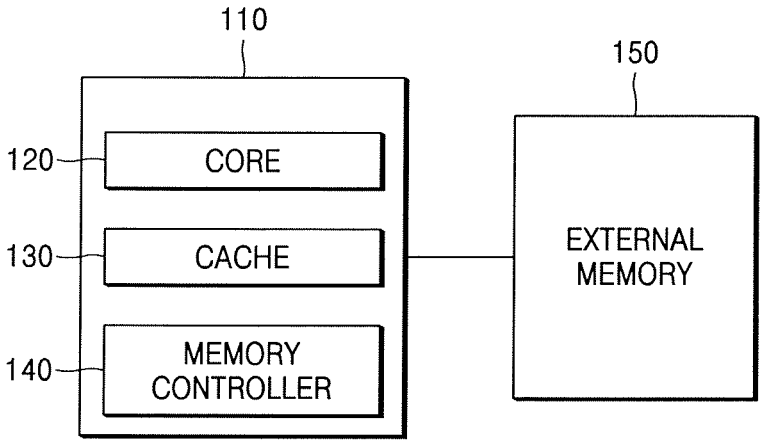
FIG. 1 is a diagram of an example of a computing device.

FIG. 1 is a diagram of an example of a computing device.

Referring to FIG. 1, a computing device 110 such as a mobile device or a desktop computer includes a core 120, a cache 130, and a memory controller 140. The computing device 110 may be a package according to functions and use purposes. In the example in FIG. 1, the computing device 110 is connected to an external memory 150.

At least one core 120, which is hardware controlling operations of all other hardware included in the computing device 110, is included in the computing device 110. The core 120 may read data from or write data to the cache 130 or the external memory 150.

The memory controller 140 controls the cache 130. The memory controller 140 receives, from the core 120, a request for reading or writing data and transmits the request to the cache 130 or the external memory 150.

The cache 130, which is a high-speed storage device of a buffer type, has a wider bandwidth than the external memory 150, but typically has a smaller storage capacity than the external memory 150. Therefore, the computing device 110 stores frequently accessed data among pieces of data in the external memory 150 in the cache 130, enabling the computing device 110 to read data from the cache 130 without repeatedly retrieving data from the external memory 150. For example, the cache 130 may include at least one type of storage medium among a flash memory, a static random access memory (RAM), and a dynamic random access memory (DRAM), but the cache 130 is not limited thereto. The cache 130 may be integrated into a package with the core 120 as an on-package memory.

The external memory 150 is a main memory in or outside the computing device 110, and typically has a larger storage capacity than the cache 130. For example, the external memory 150 includes at least one type of storage medium among a flash memory, DRAM, a hard disk, a read-only memory (ROM), an electrically erasable programmable ROM (EEPROM), a programmable ROM (PROM), a magnetic memory, a magnetic disk, and an optical disk, but the external memory 150 is not limited thereto. Referring to FIG. 1, the external memory 150 is located outside the package including the core 120 as an off-package memory.

When the cache 130 is used as a cache of the external memory 150, a large-sized tag may cause problems. The tag is information for mapping between the external memory 150 and the cache 130. For example, the tag may be address information of the external memory 150 indicating a region of the external memory 150 in which the data stored in the cache 130 is stored. A size of the tag may increase as the storage capacity of the external memory 150 increases.

The tag may be stored in a cache at a higher level than the cache 130 (not shown in FIG. 1). The cache at the higher level typically has a smaller storage capacity than the cache 130, and thus a large-sized tag may degrade performance of the cache at the higher level.

A cache hit/miss of the memory controller 140 may be determined through a tag. A cache hit indicates that a tag corresponding to an address of the external memory 150 is found in the cache 130, and a cache miss indicates that a tag corresponding to the address of the external memory 150 is not found in the cache 130.

Figure 2:
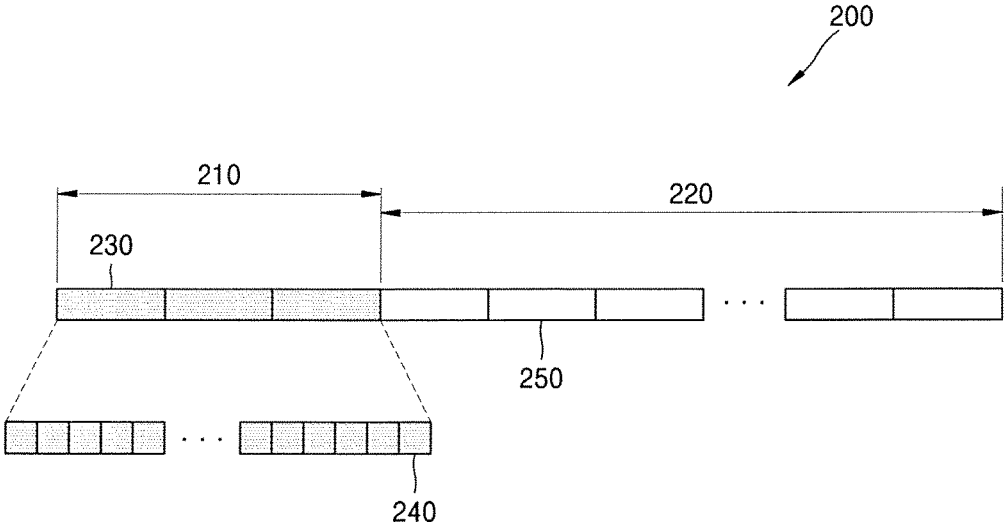
FIG. 2 is a view of an example of a cache having a set-associative structure.

FIG. 2 is a view of an example of a cache having a set-associative structure.

A method of storing a tag in a cache of a computing device but not in a higher-level cache may be provided to prevent problems caused by a large-sized cache tag. In this example, a tag and data are stored in a cache having a set-associative structure.

According to the set-associative structure, a cache set 200 includes a plurality of tag blocks 210 and a plurality of data blocks 220. Therefore, when data in the external memory 150 is stored in the cache 130, the data is stored, for example, in a data block 250 among the plurality of data blocks 220 included in the cache set 200.

Referring to FIG. 2, the cache set 200 is stored in a single line of the cache 130. A tag block 230 includes a plurality of tag areas 240.

To determine a cache hit/miss with respect to the cache having a set-associative structure, the memory controller 140 has to read the tag blocks 210 included in the cache set 200. When a cache hit is determined as a result of reading the tag blocks 210, the core 120 reads the data blocks 220 included in the cache set 200. For example, the cache having a set-associative structure may have a high cache hit rate since the plurality of tag blocks 210 are included in the cache set 200. However, a request for reading data from the cache has to be performed twice or more even if the cache hit is determined, and therefore an operation of reading the cache may be repeated several times.

Figure 3:
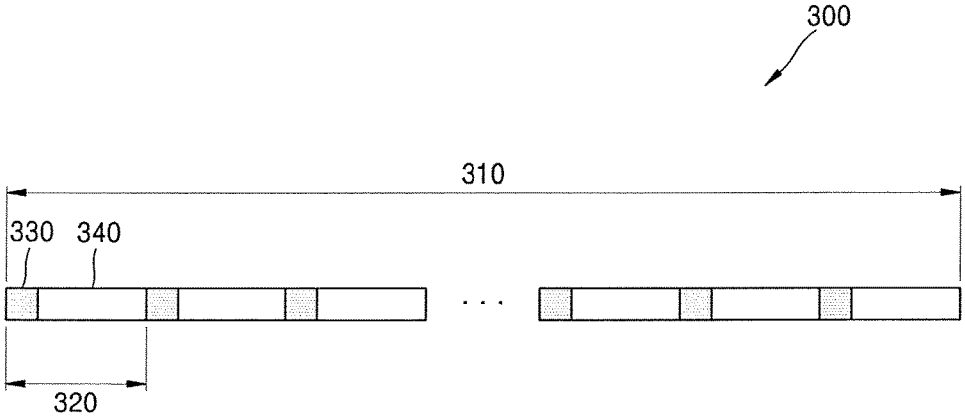
FIG. 3 is a view of an example of a cache having a direct-mapped structure.

FIG. 3 is a view of an example of a cache having a direct-mapped structure.

In this example, a tag and data are stored in a cache 300 having a direct-mapped structure. According to the direct-mapped structure, a cache set includes a single tag area and a single data area. Therefore, when data in the external memory 150 is stored in the cache, the data is stored in a specific data area of the cache. For example, the cache having a direct-mapped structure may be the same as the cache having a set-associative structure including a single tag area and a single data area in a cache set. The data area may be the same as the data block 250 of FIG. 2.

Referring to FIG. 3, a cache set 320 includes a single tag area 330 and a single data area 340. A plurality of cache sets may be stored in a single line 310 of a cache. Therefore, the core 120 may read both a tag and data of the cache at the same time.

A cache hit rate of the cache having a direct-mapped structure may be lower than a cache hit rate of the cache having a set-associative structure because the core can read only a single tag and one piece of data at a time. However, in a case of a cache hit, the number of times the cache having a direct-mapped structure must be read is reduced compared to the cache having a set-associative structure.

The cache having a direct-mapped structure or the cache having a set-associative structure may be applied to the cache 130 in FIG. 1 depending on a type of the cache 130. For example, when the cache 130 is a static RAM cache, the performance of the cache 130 may be improved by using a set-associative structure having a high cache hit rate. When the cache 130 is DRAM cache, a total speed of performing an entire program may be faster even if a direct-mapped mapped structure having a relatively lower cache hit rate is used due to a short processing time of data.

Figure 4:
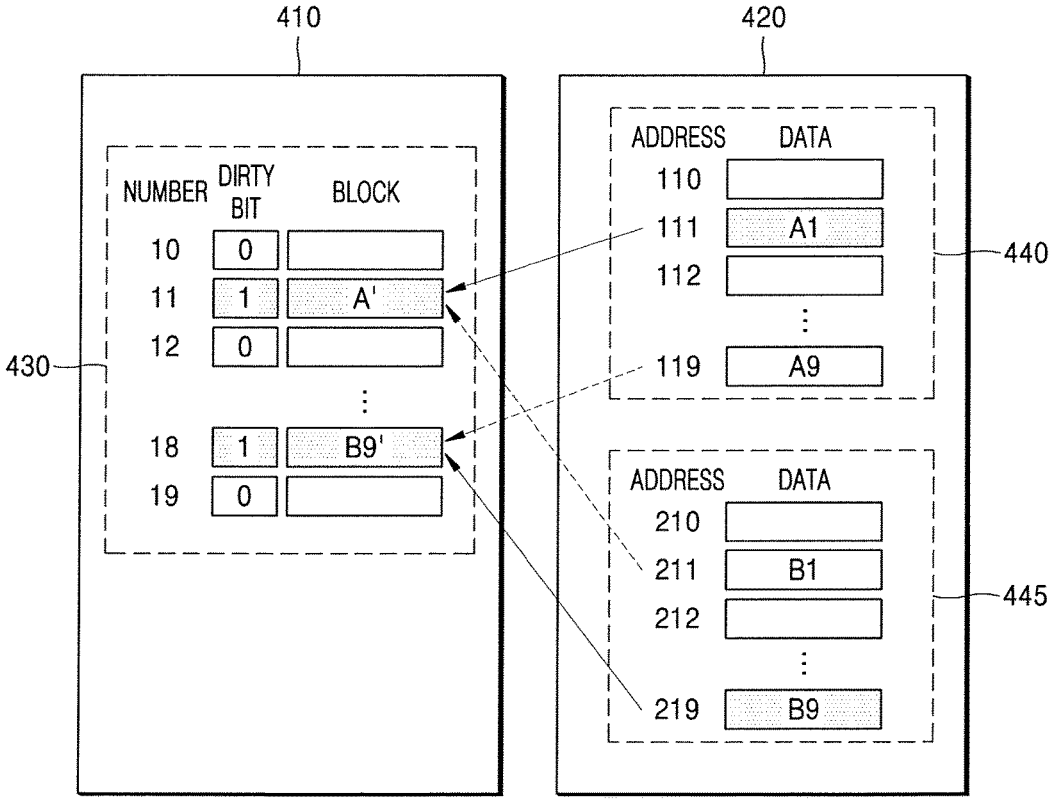
FIG. 4 is a view illustrating an example of a method of mapping data of an external memory in a cache having a direct-mapped structure.

FIG. 4 is a view illustrating an example of a method of mapping data of an external memory in a cache having a direct-mapped structure.

A cache 410 having a direct-mapped structure includes a plurality of cache groups 430, and an external memory 420 includes a plurality of pages, for example, first and second pages 440 and 445. For example, the cache groups 430 may be units used in the cache 410, and the first and second pages 440 and 445 may be units used in the external memory 420. Pieces of data in the first and second pages 440 and 445 may be stored in a specific block in the cache groups 430. Several pieces of data of the external memory 420 may share blocks of the cache 410. The cache 410 further includes dirty bits beside the blocks, the dirty bits indicating whether the corresponding blocks are in a dirty state.

When a request for reading data in the external memory 420 is transmitted from the core 120, the memory controller 140 compares a tag stored in the cache 410 with an address of the external memory 420 requested for reading data and determines a cache hit/miss.

The memory controller 140 determines whether the cache 410 is in a dirty state through the dirty bits without reading the cache 410. The memory controller 140 receives a request for writing data from the core 120 and stores a value of the dirty bits as 1 if data stored in the cache 410 is different from data stored in the external memory 420 when data is written in the cache 410. Therefore, when the memory controller 140 determines a cache hit and the dirty bits have a value of 0, the memory controller 140 determines the cache 410 to be in a clean state in which data stored in the cache 410 is the same as data stored in the external memory 420. When the memory controller 140 determines a cache hit and the dirty bits have a value of 1, the memory controller 140 determines the cache 410 to be in a dirty state in which data stored in the cache 410 is different from data stored in the external memory 420. Referring to FIG. 4, one of data of address 111 of the first page 440 and data of address 211 of the second page 445 is stored in block 11 of the cache 410. When a tag corresponding to block 11 of the cache 410 indicates address 111 of the external memory 420, the memory controller 140 determines a cache hit. Since a value of dirty bits corresponding to block 11 of the cache 410 is 1, the memory controller 140 determines the cache 410 to be in a dirty state in which data A' stored in block 11 of the cache 410 is different from data A1 stored in address 111 of the external memory 420.

Figure 5:
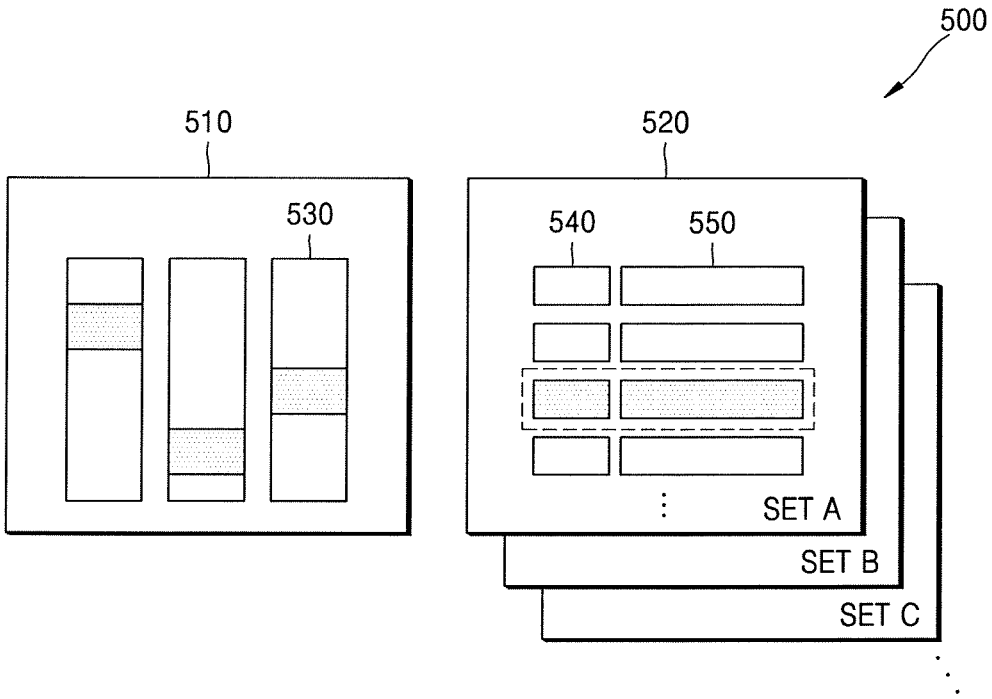
FIG. 5 is a view of an example of a memory controller.

FIG. 5 is a view of an example of a memory controller.

Self-balancing dispatch is used for sufficiently utilizing a bandwidth of the cache 130 and the external memory 150. Self-balancing dispatch is a method of calculating a predicted process time of the external memory 150 or the cache 130 when a request for reading data is received, and transmitting the request to the external memory 150 or the cache 130 based on a result of the calculation. Self-balancing dispatch may be applied only when the cache 130 is in a clean state. When the cache 130 is in a dirty state, the memory controller 140 reads data only from the cache 130 storing the latest value, without performing the self-balancing dispatch. Therefore, it is necessary to determine whether the cache 130 is in a dirty state to apply the self-balancing dispatch.

Referring to FIG. 5, a memory controller 500, which is included in the memory controller 140 of FIG. 1, tracks the cache 130 in a dirty state. The memory controller 500 includes a dirty area detector 510 and a dirty list manager 520.

The dirty area detector 510 detects a page of the external memory 150 having a lot of requests for writing data using counting Bloom filters. In more detail, the dirty area detector 510 inputs addresses of the external memory 150 in which data is requested to be written to a plurality of hash functions of the counting Bloom filters. Next, a plurality of tables 530 of the counting Bloom filters are indexed using values output from the hash functions. For example, the dirty area detector 510 increases counters of the counting Bloom filters corresponding to addresses of the external memory 150 in which data is requested to be written in each of the plurality of tables. That is, each of the elements of the plurality of tables 530 is a counter. Therefore, the counters in the plurality of tables 530 corresponding to an address of the external memory 150 increase every time a request for writing data in that address of the external memory 150 is received, and the dirty area detector 510 detects a corresponding page to be in a dirty state when all counters stored in the plurality of tables are equal to or greater than a threshold. The dirty area detector 510 detects a dirty state in a unit of a page address of the external memory 150. When a dirty area is detected, the dirty area detector 510 decreases the corresponding counters by half.

The dirty list manager 520 manages a dirty list including the page address of the external memory 150 determined to be in a dirty state by the dirty area detector 510. The dirty list may include a Not Recently Used (NRU) page 540 and a page tag 550 with respect to the page in a dirty state. The NRU page 540, which displays an area that is not recently used, may be a reference to select a sacrificial page.

When writing data in a memory is requested, the request for writing data is transmitted to the cache 130 and the external memory 150 by a write-back method if a page including the corresponding address is already in the dirty list. According to the write-back method, only data stored in the cache 130 is corrected and data stored in the external memory 150 is maintained during a cache hit, and the corrected data is stored in the external memory 150 during a cache miss.

When the dirty area detector 510 detects a new dirty area, the dirty list manager 520 selects and deletes a sacrificial page among pages stored in an existing dirty list, and adds a page determined to be in a dirty state. The sacrificial page is a page deleted from a dirty list so that a new page may be stored instead. A reference to select a sacrificial page may be an NRU page, a Least Frequently Used (LFU) page, a Least Recently Used (LRU) page, or a First-In First-Out (FIFO) page, but a sacrificial page is not limited thereto.

A sacrificial page needs to be guaranteed to be in a clean state. Therefore, a request for reading data is transmitted to all cache sets A, B, C, etc., of the cache 130 corresponding to a sacrificial page to determine whether there is data in a dirty state among pieces of data included in the sacrificial page. When the cache 130 is hit and in a dirty state, the memory controller 140 updates the data of the external memory 150 to data of a corresponding cache set to make the sacrificial page be in a clean state.

For example, when a request for writing data is transmitted to the memory controller 500, the memory controller 140 has to read dirty bits in the cache 130 to determine whether the cache 130 is dirty. Therefore, the memory controller 140 has to read data at least once according to a request for reading data. As a result, the efficiency of the cache 130 may be reduced because the memory controller 140 has to read data every time when receiving a request for reading data.

Figure 6:
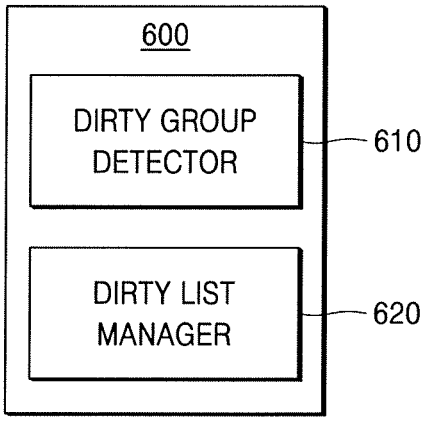
FIG. 6 is a block diagram of another example of a memory controller.

FIG. 6 is a block diagram of another example of a memory controller.

Referring to FIG. 6, a memory controller 600, which is included in the memory controller 140 of FIG. 1, tracks the cache 130 in a dirty state. The memory controller 600 includes a dirty group detector 610 and a dirty list manager 620.

The dirty group detector 610 detects that a cache group is in a new dirty state. In more detail, when receiving a request for writing data to the external memory 150, the dirty group detector 610 modifies addresses of a cache group related to a physical address of the external memory 150, increases counters corresponding to the modified addresses of the cache group, and detects that a cache group is in a dirty state based on the counters. The cache group may be a unit including a plurality of cache sets (not shown in FIG. 6).

Each of the cache sets includes a single tag area and a single data area. In other words, the cache 130 has a direct-mapped structure.

The dirty group detector 610 modifies addresses of a cache group using a plurality of hash functions, and detects that the cache group is in a dirty state when the counters corresponding to the modified addresses of the cache group are equal to or greater than a threshold. The dirty group detector 610 decreases the corresponding counters by half after detecting that the cache group is in a dirty state.

The dirty list manager 620 manages the cache group in a dirty state and a dirty list including dirty bits according to a detection result of the dirty group detector 610. The dirty bits indicate whether the cache set included in the cache group is in a dirty state. The dirty list manager 620 includes a storage unit storing the dirty list.

When receiving a request for writing data to or reading data from a memory, the dirty list manager 620 determines whether the cache group is in a dirty state by determining whether addresses of the cache group are included in the dirty list. In more detail, when receiving a request for writing data to or reading data from the external memory 150, the dirty list manager 620 determines whether the cache group is in a dirty state by modifying addresses of the cache group related to a physical address of the external memory 150 and determining a corresponding dirty list.

If the addresses of the cache group are not included in the dirty list, the dirty list manager 620 deletes addresses of another cache group included in the dirty list. The deleted cache group is defined as a sacrifice group. A reference for selecting a sacrifice group corresponds to a reference for selecting the sacrificial page of FIG. 5, and thus a detailed description thereof will not be repeated.

When a cache set in a dirty state is included in a sacrifice group, the dirty list manager 620 outputs an address of the cache set in a dirty state included in the sacrifice group to maintain the sacrifice group in a clean state.

Figure 7:
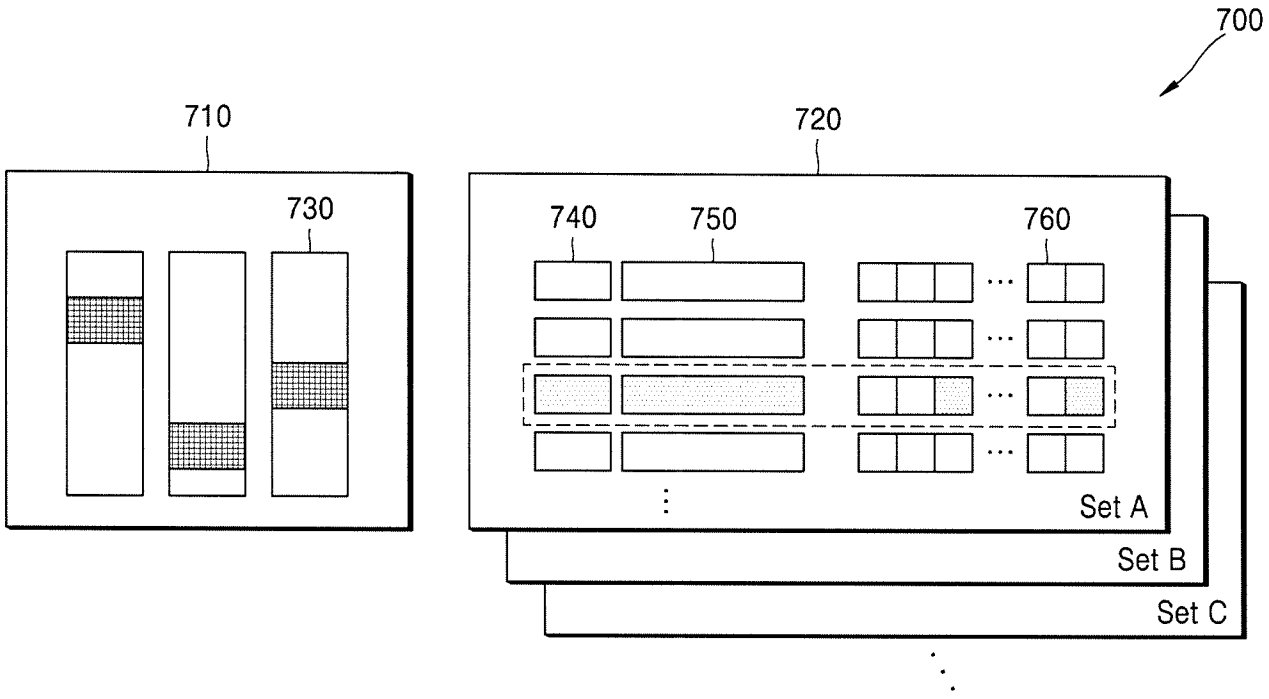
FIG. 7 is a view of another example of a memory controller.

FIG. 7 is a view of another example of a memory controller.

Referring to FIG. 7, a memory controller 700, which is included in the memory controller 140 of FIG. 1, tracks the cache 130 in a dirty state. The memory controller 700 includes a dirty group detector 710 and a dirty list manager 720.

Compared to FIG. 5, the dirty group detector 710 uses a cache group including a plurality of cache sets A, B, C, etc., but not a page unit, as an index unit. In other words, the dirty group detector 710 uses an address of a cache group, but not a physical address of the external memory 150, as an index unit. Therefore, the memory controller 700 reduces the number of times reading the cache 130 as immediately recognizing a cache group in a dirty state. The dirty group detector 710 includes a plurality of tables 730 of counting Bloom filters. As the plurality of tables 730 correspond to the plurality of tables 530 of FIG. 5, a detailed description thereof will not be repeated.

The dirty list manager 720 manages a dirty list including an NRU page 740, a tag 750 of a cache group, and dirty bits 760. As the NRU page 740 corresponds to the NRU page 540 of FIG. 5, a detailed description thereof will not be repeated.

A unit of the tag 750 of a cache group of FIG. 7 is a cache group, while a unit of the page tag 550 of FIG. 5 is a page address of the external memory 150. The dirty list includes the dirty bits 760 with respect to each of the cache sets included in the cache group. Therefore, the memory controller 140 may easily determine which cache set included in the cache group is in a dirty state.

Figure 8:
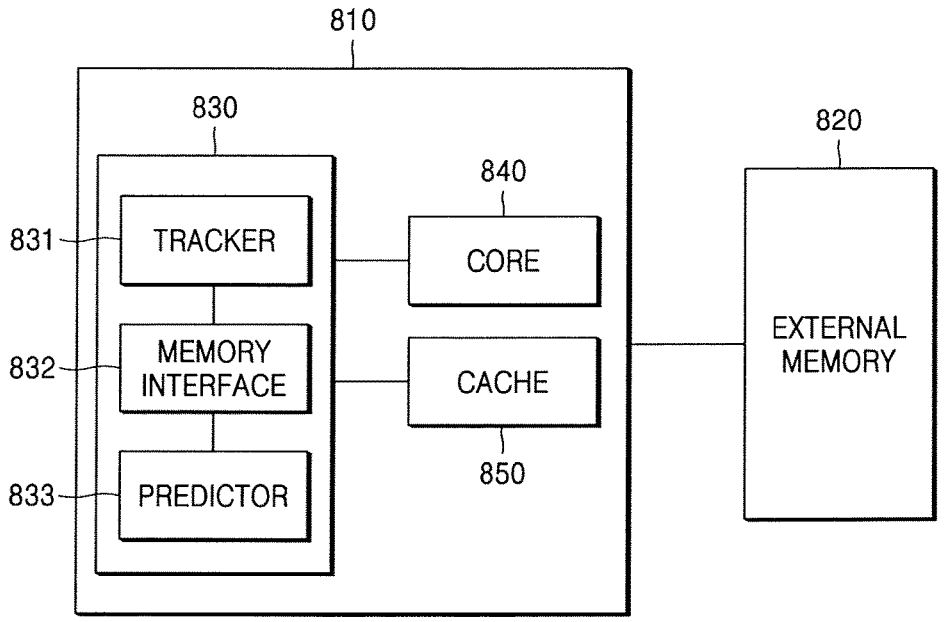
FIG. 8 is a block diagram of an example of a computing device.

FIG. 8 is a block diagram of an example of a computing device.

The memory controller 140 determines whether the memory controller 140 determines a cache hit or a cache miss before accessing the cache 130, and accesses the cache 130 when the memory controller 140 determines a cache hit. The method of determining a cache hit may be to use a miss map stored in a higher-level cache of the cache 130. However, it may be a burden on the higher-level cache to store the miss map in the higher-level cache.

In light of this, a predictor is to determine whether the cache 130 includes data.

Referring to FIG. 8, a computing device 810 includes a memory controller 830, a core 840, and a cache 850, and may be a package according to functions and use purposes. In the example in FIG. 8, the computing device 810 is connected to an external memory 820.

As the core 840 and the external memory 820 correspond to the core 120 and the external memory 150 of FIG. 1, a detailed description thereof will not be repeated.

The cache 850 stores partial information in the external memory 820 in cache set units each including a single tag area and a single data area. The cache 850 may be DRAM having a direct-mapped structure, but the cache 850 is not limited thereto.

When receiving a request for the external memory 820 from the core 840, the memory controller 830 tracks the cache 850 in a dirty state, predicts whether the cache 850 is hit, and transmits the request to the external memory 820 or the cache 850 based on the tracking result or the prediction result.

The memory controller 830 includes a tracker 831, a memory interface 832, and a predictor 833.

The tracker 831 corresponds to the memory controllers 600 and 700 of FIGS. 6 and 7. When receiving a request for the external memory 820 from the core 840, the tracker 831 modifies addresses of a cache group related to a physical address of the external memory 820, increases counters corresponding to the modified addresses of the cache group, and detects that a cache group is in a dirty state based on the counters. The tracker 831 tracks a dirty state of the cache 850 by managing a dirty list including the cache group in a dirty state and dirty bits according to the detection result. When receiving a request for a memory, the tracker 831 determines whether the cache group is in a dirty state by determining whether the addresses of the cache group are included in the dirty list.

The predictor 833 predicts whether the cache 850 is hit. The predictor 833 may be an instruction-based predictor or a region-based predictor, but the predictor 833 is not limited thereto.

The memory interface 832 transmits a request to the external memory 820 or the cache 850 based on the tracking result or the prediction result. In more detail, when the request is a request for reading first data in the external memory 820, and when the tracker 831 determines that the cache group is in a clean state and the predictor 833 predicts that a cache in the cache group is a cache hit, the memory interface 832 transmits a request for reading data to the external memory 820 or the cache 850 based on a utilization rate of a bandwidth of the external memory 820 or the cache 850.

When the request is a request for reading first data in the external memory 820, and when the tracker 831 determines that the cache group is in a clean state and the predictor 833 predicts that a cache in the cache group is a cache miss, the memory interface 832 transmits the first data to the cache 850 after transmitting the request for reading first data to the external memory 820.

When the request is a request for writing second data in the external memory 820, and when the tracker 831 determines that the cache group is in a dirty state, the memory controller 140 transmits the second data to the cache 850. When the tracker 831 determines that the cache group is in a clean state, the memory controller 140 transmits the second data to the cache 850 and the external memory 820.

Figure 9:
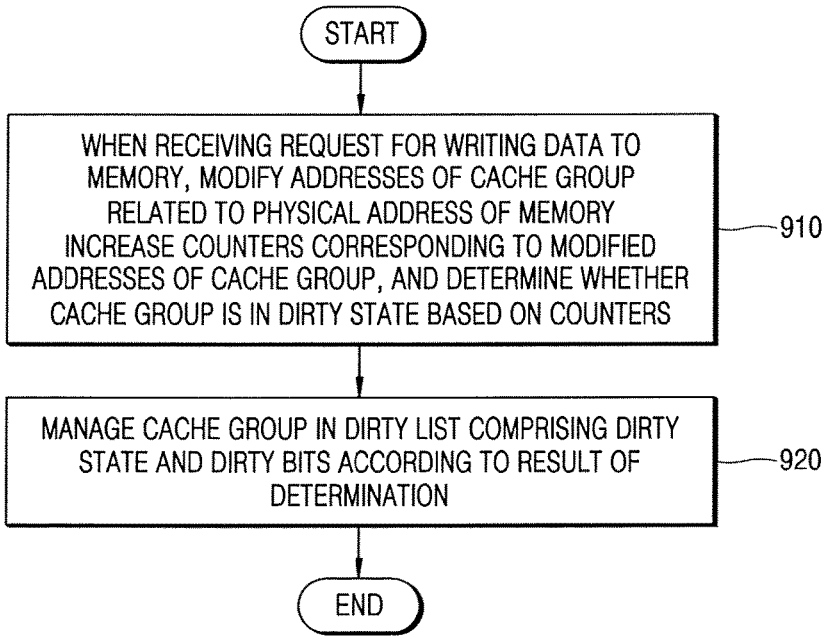
FIG. 9 is a flowchart illustrating an example of a method of controlling a memory.

FIG. 9 is a flowchart illustrating an example of a method of controlling a memory.

In operation 910, when receiving a request for writing data to the external memory 150, the tracker 831 modifies addresses of a cache group related to a physical address of the external memory 150, increases counters corresponding to the modified addresses of the cache group, and determines whether a cache group is in a dirty state based on the counters.

The tracker 831 modifies addresses of a cache group using a plurality of hash functions, and determines that the cache group is in a dirty state when all of the counters corresponding to the modified addresses of the cache group are equal to or greater than a threshold. The tracker 831 decreases the corresponding counters by half after detecting that the cache group is in a dirty state.

Each of the cache sets includes a single tag area and a single data area. In other words, the cache 850 has a direct-mapped structure.

In operation 920, the tracker 831 manages a dirty list including the cache group in a dirty state and dirty bits according to the detection result. The dirty bits indicate whether the cache set included in the cache group is in a dirty state.

When receiving a request for writing data to a memory, the tracker 831 determines whether the cache group is in a dirty state by determining whether addresses of the cache group are included in the dirty list.

If the addresses of the cache group are not included in the dirty list, the tracker 831 deletes addresses of another cache group included in the dirty list. The deleted cache group is defined as a sacrifice group.

When a cache set in a dirty state is included in a sacrifice group, the tracker 831 outputs an address of the cache set in a dirty state included in the sacrifice group to maintain the sacrifice group in a clean state.

Figure 10:
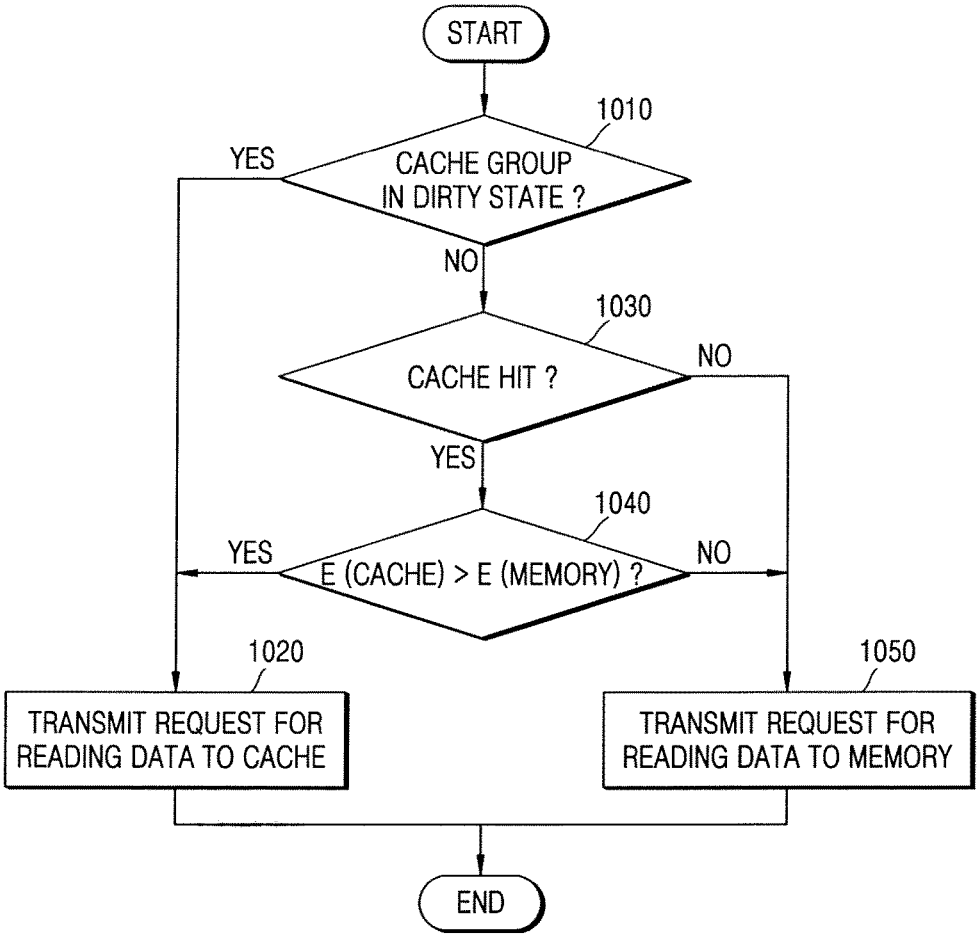
FIG. 10 is a detailed flowchart illustrating an example of a method of transmitting a request for reading data to a cache and an external memory.

FIG. 10 is a detailed flowchart illustrating an example of a method of transmitting a request for reading data to the cache 850 and the external memory 820.

When receiving a request for reading data from the external memory 820 from the core 840, the memory controller 830 determines whether to transmit the request for reading data to the cache 850 or the external memory 820 by determining whether the cache 850 is in a dirty state and whether the cache 850 is hit, and by comparing an available bandwidth of the cache 850 with an available bandwidth of the external memory 820.

In operation 1010, the tracker 831 determines whether a cache group is in a dirty state in the cache 850 corresponding to the external memory 150 from which data is to be read. The memory controller 830 modifies an address of a cache group in a dirty state related to a physical address of the external memory 150 to which data reading is requested. When the modified address of the cache group is included in a dirty list and the dirty bits 760 of a cache set included in the cache group are 1, the memory controller 830 determines that the request for reading data is related to a cache set in a dirty state. If the request for reading data is related to the cache set in a dirty state, the memory interface 832 needs to transmit the request for reading data to the cache 850 without considering self-balancing dispatch. However, if the request for reading data is related to a cache set in a clean state, the memory controller 830 predicts whether the cache 850 is hit. In other words, operation 1020 is performed when the cache 850 corresponding to the external memory 150 from which data is to be read is in a dirty state, and operation 1030 is performed when the cache 850 is in a clean state.

In operation 1020, the memory interface 832 transmits the request for reading data to the cache 850.

In operation 1030, the predictor 833 predicts whether the cache 850 corresponding to the external memory 150 from which data is to be read is hit. When the cache 850 is predicted as a cache hit, the memory interface 832 performs a self-balancing dispatch. However, when the cache 850 is predicted as a cache miss, the memory interface 832 transmits a request for reading data to the external memory 820. In other words, operation 1040 is performed when the cache 850 is predicted as a cache hit, and operation 1050 is performed otherwise.

In operation 1040, the memory interface 832 compares an available bandwidth E of the cache 850 with an available bandwidth E of the external memory 820. In more detail, the memory interface 832 calculates available bandwidths E of the cache 850 and the external memory 820 using a method of determining the number of requests in queues of the cache 850 and the external memory 820. Therefore, the memory interface 832 may more efficiently utilize the bandwidths of the cache 850 and the external memory 820 based on a self-balancing dispatch. Operation 1020 is performed when the available bandwidth E of the cache 850 is wider than the available bandwidth E of the external memory 820. However, operation 1050 is performed when the available bandwidth E of the external memory 820 is wider than the available bandwidth E of the cache 850.

In operation 1050, the memory interface 832 transmits a request for reading data to the external memory 820. The memory interface 832 maintains the cache 850 in a clean state by transmitting data stored in the external memory 820 to the cache 850.

The prediction of a cache hit/miss in operation 1030 may be determined by comparing a value of a tag in the cache 850 with an address of a request for reading data from a memory after operation 1020 or operation 1050.

Figure 11:
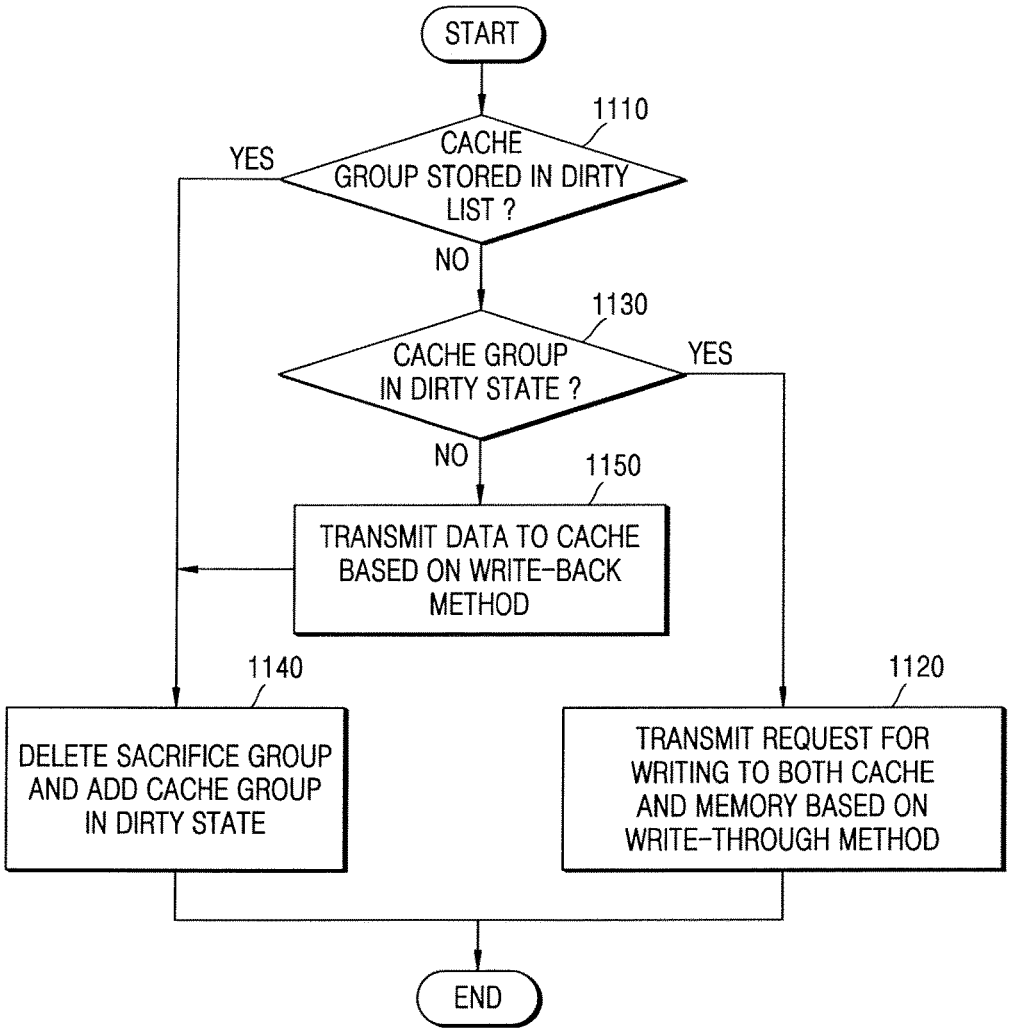
FIG. 11 is a detailed flowchart illustrating an example of a method of transmitting a request for writing data to a cache and an external memory.

FIG. 11 is a detailed flowchart illustrating an example of a method of transmitting a request for writing data to the cache 850 and the external memory 820.

When receiving a request for writing data from the core 840, the memory controller 830 transmits data to be written to the cache 850 or the external memory 820 based on whether the cache 850 is in a dirty state.

In operation 1110, the tracker 831 determines whether a cache group is in a dirty state by determining whether the cache group is stored in a dirty list. Operation 1140 is performed when a cache group that has received a request for writing data is stored in the dirty list, and operation 1130 is performed otherwise.

In operation 1130, the tracker 831 determines whether the cache group is in a dirty state. In more detail, the tracker 831 modifies addresses of a cache group related to a physical address of the external memory 820, increases counters corresponding to the modified addresses of the cache group, and determines whether a cache group is in a new dirty state based on the counters. Operation 1150 is performed when it is determined hat the cache group is in a new dirty state and the counters corresponding to the cache group in a dirty state are reduced by half. Operation 1120 is performed when it is determined that the cache group is not in a new dirty state.

In operation 1140, the memory interface 832 transmits data to the cache 850 based on a write-back method. The tracker 831 changes dirty bits of a cache set receiving data to 1.

In operation 1150, the tracker 831 deletes a sacrifice group stored in the dirty list and adds a cache group in a dirty state. A reference for selecting a sacrifice group corresponds to that of selecting the sacrificial page of FIG. 5, and thus a detailed description thereof will not be repeated. The tracker 831 determines whether cache sets in the sacrifice group are in a dirty state based on the dirty bits 760 of the sacrifice group. The tracker 831 transmits pieces of data stored in a cache set in a dirty state among the cache sets in the sacrifice group and changes the sacrifice group to be in a clean state. Operation 1140 is performed after operation 1150 is performed. In other words, a request for writing data is transmitted to a cache after the cache group in a new dirty state is added. The tracker 831 changes the dirty bits 760 of a cache set receiving data to 1.

In operation 1120, the memory interface 832 transmits a request for writing data to both the cache 850 and the external memory 820 based on a write-through method. Therefore, the cache 850 in a dirty state is changed to be in a clean state.

According to the above examples, a method and a device for controlling a memory determines whether a cache group is in a dirty state without reading a cache, and transmits a request for reading or writing data to the cache or an external memory according to the determination result. Therefore, the performance of the cache is improved because the number of times data is read from the cache is reduced.

The computing device 110, the core 120, the cache 130, the memory controller 140, and the external memory 150 in FIG. 1, the memory controller 500, the dirty area detector 510, and the dirty list manager 520 in FIG. 5, the memory controller 600, the dirty group detector 610, and the dirty list manager 620 in FIG. 6, the memory controller 700, the dirty group detector 710, and the dirty list manager 720 in FIG. 7, and the computing device 810, the external memory 820, the memory controller 830, the tracker 831, the memory interface 832, the predictor 833, the core 840, and the cache 850 in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A memory controller comprising:

a dirty group detector configured to, in response to receiving a request for writing data to a memory, modify addresses of a cache group related to a physical address of the memory using a plurality of hash functions, *the cache group including a plurality of cache sets,* increase *a plurality of* counters, *each of the plurality of counters* corresponding to *an address of* the modified addresses of the cache group, [and]

detect whether the cache group is in a dirty state based on the counters[;], and a dirty list manager configured to manage the cache group in the dirty state and a dirty list comprising dirty bits according to a result of the detecting[;], wherein *each of* the dirty bits [indicate] *indicates* whether [a] *one of the plurality of* cache sets [set included in the cache group] is in the dirty state, *and*

*wherein the dirty group detector is further configured to reduce the counters by half in response to the result of the detecting being that the cache group is in the dirty state.*

2. The memory controller of claim 1, wherein the dirty group detector is further configured to detect that the cache group is in the dirty state in response to all of the counters corresponding to the modified addresses of the cache group being equal to or greater than a threshold.

[3. The memory controller of claim 2, wherein the dirty group detector is further configured to reduce the counters by half in response to the result of the detecting being that the cache group is in the dirty state.]

4. The memory controller of claim 1, wherein each of the cache sets comprises a single tag area and a single data area.

5. The memory controller of claim 1, wherein the dirty list manager is further configured to, in response to receiving the request for writing data to the memory, determine whether the cache group is in the dirty state by determining whether addresses of the cache group are included in the dirty list.

6. The memory controller of claim 5, wherein the dirty list manager is further configured to, in response to the addresses of the cache group not being included in the dirty list, delete an address of another cache group in the dirty list and manage the dirty list.

7. The memory controller of claim 6, *wherein* the dirty list manager is further configured to, in response to a cache set in the dirty state being included in the deleted cache group, output an address of the cache set in the dirty state included in the deleted cache group.

8. A computing device comprising:

a core;

a cache configured to store partial information in a memory in a cache set comprising a single tag area and a single data area; and a memory controller configured to, in response to receiving a request for the memory from the core, track whether the cache is in a dirty state, predict whether the cache is hit, wherein the cache hit indicates that the cache includes data associated with the request, and transmit the request to the memory or the cache based on a result of the tracking or a result of the predicting[;], wherein the memory controller comprises:

a tracker configured to, in response to receiving a request for the memory from the core, modify addresses of a cache group related to a physical address of the memory, *the cache group including a plurality of cache sets,* increase *a plurality of* counters, *each of the plurality of counters* corresponding to *an address of* the modified addresses of the cache group, detect whether the cache group is in a dirty state based on the counters, and track a dirty state of the cache by managing a dirty list comprising the cache group in the dirty state and dirty bits according to a result of the detecting[;],

*wherein the tracker reduces the counters by half in response to a detection that the cache group is in the dirty state,* a predictor configured to predict whether the cache is hit[;], and a memory interface configured to transmit the request to the memory or the cache based on the result of the tracking or the result of the predicting[;], wherein *each of* the dirty bits [indicate] *indicates* whether one of the plurality of [the] cache [set in the cache group] *sets* is in the dirty state.

9. The computing device of claim 8, wherein the tracker is further configured to, in response to receiving a request for the memory, determine whether the cache group is in the dirty state by determining whether addresses of the cache group are included in the dirty list; and the memory interface is further configured to, in response to the request being a request for reading first data in the memory, the tracker determining that the cache group is in a clean state, and the predictor predicting that a cache in the cache group is a cache hit, transmit a request for reading data to the memory or the cache based on a utilization rate of a bandwidth of the memory or the cache.

10. The computing device of claim 8, wherein the memory interface is further configured to, in response to the request being a request for reading first data in the memory, the tracker determining that the cache group is in a clean state, and the predictor predicting that a cache in the cache group is a cache miss, transmit the first data to the cache after transmitting the request for reading data to the memory.

11. The computing device of claim 8, wherein the memory controller is further configured to, in response to the request being a request for writing second data in the memory, transmit the second data to the cache in response to the tracker determining that the cache group is in the dirty state, and transmit the second data to the cache and the memory in response to the tracker determining that the cache group is in a clean state.

12. The computing device of claim 8, wherein the memory is located outside the package; and the predictor is an instruction-based predictor.

13. A method of controlling a memory, the method comprising:

in response to receiving a request for a memory, modifying addresses of a cache group related to a physical address of the memory using a plurality of hash functions, *the cache group including a plurality of cache sets,* increasing *a plurality of* counters*, each of the plurality of counters* corresponding to *an address of* the modified addresses of the cache group, [and]

detecting whether the cache group is in a dirty state based on the counters;

[;]*reducing the counters by half in response to detecting that the cache group is in the dirty state*, and managing the cache group in the dirty state and a dirty list comprising dirty bits according to a result of the detecting[;], wherein *each of* the dirty bits [indicate] *indicates* whether [a] *one of the plurality of* cache [set in the cache group] *sets* is in the dirty state.

14. The method of claim 13, wherein the detecting comprises:

detecting that the cache group is in the dirty state in response to all of the counters corresponding to the modified addresses of the cache group being equal to or greater than a threshold.

[15. The method of claim 14, further comprising reducing the counters by half in response to detecting that the cache group is in the dirty state.]

16. The method of claim 13, wherein each of the cache sets comprises a single tag area and a single data area.

17. The method of claim 13, further comprising determining whether the cache group is in the dirty state by determining whether addresses of the cache group are included in the dirty list in response to receiving a request for writing data to the memory.

18. The method of claim 17, further comprising deleting an address of another cache group included in the dirty list in response to the addresses of the cache group not being included in the dirty list.

19. The method of claim 18, further comprising outputting an address of a cache set in the dirty state included in the deleted cache group in response to the cache set in the dirty state being included in the deleted cache group.

* * * * *